May 20, 1941. J. G. BROWN 2,242,812
ELECTRICAL SYSTEM
Filed Nov. 24, 1939
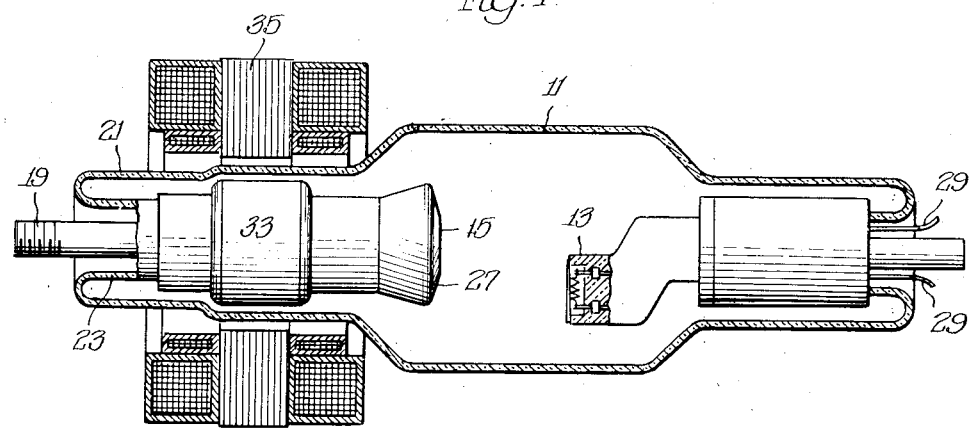
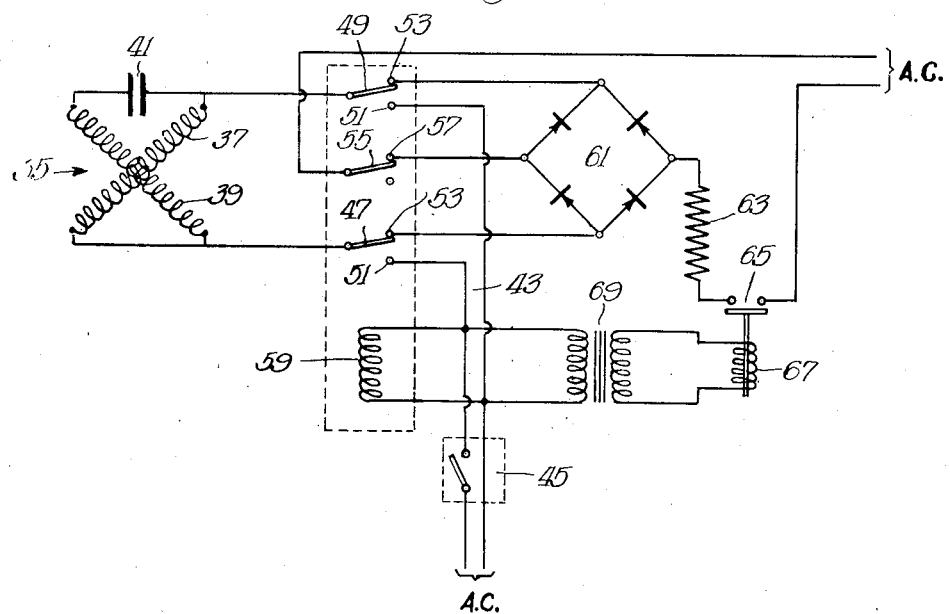
INVENTOR.
James G. Brown,
BY: Junius F. Cook, Jr.
ATTORNEY.

Patented May 20, 1941

2,242,812

UNITED STATES PATENT OFFICE 2,242,812

ELECTRICAL SYSTEM

James G. Brown, Congress Park, Ill., assignor to General Electric X-Ray Corporation, Chicago, Ill., a corporation of New York Application November 24, 1939, Serial No. 305,771

6 Claims. (Cl. 250—93)

My invention relates in general to electric power systems and has more particular reference to the provision of means for electrically braking a motor, the invention having especial application to braking the motor driven rotary anode in an X-ray tube.

An important object of the present invention is to provide an improved braking system for controlling an electric motor, more particularly a motor of the sort used in driving a rotary anode in an X-ray tube.

Another important object resides in providing means for utilizing direct current power in an alternating current motor for checking the rotation of the same; a further object being to utilize direct current power for braking a single phase capacitator type motor.

Another important object resides in braking an alternating current motor by converting alternating current to unidirectional power and by applying the unidirectional power upon windings of a coasting alternating current motor to bring the same rapidly to stopped condition; a further object being to produce unidirectional power for motor braking purposes by rectifying alternating current power.

These and numerous other important objects, advantages and inherent functions of the invention will become apparent as the same is more fully understood from the following description, which, taken in connection with the accompanying drawing, discloses a preferred embodiment of the invention.

Referring to the drawing:

Figure 1 is a sectional view taken through an X-ray tube, having a rotating anode and an electric motor for rotating the anode; and Figure 2 is a diagram illustrating an electrical braking system embodying the present invention, which system is particularly well suited for application to rotating anode X-ray tubes of the type shown in Figure 1.

To illustrate my invention, I have shown on the drawing an X-ray tube 11, comprising spaced-apart cathode and anode means 13 and 15 enclosed within a preferable glass envelope 17. The anode 15 is of the rotating type, being supported for rotation upon a spindle 19, which, in turn, is mounted on the envelope 17 at one end thereof. As shown, the envelope 17 has an extension 21 within which the anode 15 is snugly disposed, the envelope having a reentrance sleeve-like portion 23, forming an annular space between the extension 21 and the reentrant portion 23. The spindle 19 has a portion extending within the sealed envelope and on which the anode 15 is rotatably mounted in any suitable or preferred fashion, as by suitable bearings or other anti-friction means; and the spindle 19 has a portion extending outwardly of the envelope, said spindle being suitably sealed to the envelope at the place where it emerges therefrom.

It should be understood that X-ray generators function to produce X-rays at the anode, in response to activation accomplished by electronic action established by operation of the cathode 13, said electronic action consisting of the impingement of electrons emitted by the cathode upon a target 27 forming a part of the anode 15. Electron emission by the cathode is accomplished by electrically exciting the same with power delivered to the cathode through suitable conductors 29, which enter the cathode end of the envelope through suitable seals. Electron flow between the cathode and the anode likewise is established under the influence of electrical power applied between the anode and cathode, as by means of a conductor, which is electrically connected upon the exposed end of the spindle 19, and one of the cathode conductors 29. Any suitable system for supplying electrical power to the cathode and the anode, for causing the same to operate for the generation of X-rays, may be utilized, but since the same does not form a part of the present invention, I have omitted the showing of such tube energizing system in the drawing.

When the tube is in operation as an X-ray generator, however, electronic impingement on the target 27 results in generation of relatively large quantities of heat at the target, which is dissipated thence through the body of the anode 15, and thence outwardly of the envelope 11 through the spindle 19, the exposed end of which may be fitted with heat radiating means.

The temperature of the generator, and particularly of the anode 15, may be of the order of 500° C. and up; and it is desirable that the anode 15 be rotated at high speed in order to minimize the danger of overheating the target itself at the point of electron impact, the target, to this end, being mounted for rotation on its spindle on anti-friction bearings and carrying the rotor 33 of an electric motor. This rotor is fixed on the anode within the envelope extension 21 in position to cooperate with an externally arranged stator 35 which encircles the envelope extension 21. When the stator 35 is electrically energized, the rotor and anode on which mounted may be caused to rotate within the envelope at high speed.

Under ordinary circumstances, an X-ray generator of the character described remains in operation for but short intervals of time of the order of a few seconds, such short intervals being ordinarily sufficient to accomplish the making of X-ray photographs. The X-ray generator is caused to operate by first energizing the stator 35 in order to bring the anode up to speed, at which time the tube energizing system connected with the anode and cathode is actuated for the development of X-rays through electronic impingement upon the target 27, the X-ray exposure being made while the tube is thus in operation. Immediately upon the completion of the exposure, the tube energizing system is disabled and the anode driving motor deenergized. As a safety precaution, means is preferably provided for insuring that the anode is rotating at full operating speed throughout the period of operation of the tube energizing system.

The anode, being of appreciable mass and supported on anti-friction bearing means, will continue to rotate for an appreciable interval, of the order of several minutes, after the motor 35 has been deenergized.

Naturally, the service life of an X-ray tube having a rotating anode, to some extent, depends upon wear in the anode support bearing means, which is relatively rapid in X-ray tubes in which the bearings are subjected to the excessive heat developed in the anode during the operation of the tube. The service life of the bearings is further shortened due to the fact that lubrication, in the ordinary sense, cannot be provided where the bearings are operated under the substantial vacuum conditions prevailing in X-ray tubes. In order, therefore, to conserve the bearings and to lengthen the useful life of an X-ray tube of the character described, it is desirable to provide means for bringing the rotating anode rapidly to standstill condition after the termination of the period of useful rotation thereof; and to this end, I have provided a braking system having novel features whereby unidirectional electrical power is applied to the windings of the anode driving motor in order to bring the same rapidly to standstill condition.

The anode driving motor, as shown in Figure 2 of the drawing, comprises a single phase, capacitator type, alternating current motor, although, obviously, the present invention is not necessarily restricted to the particular type of motor shown. As illustrated, however, the motor 35 comprises a pair of windings 37 and 39, which are interconnected and connected with a condenser 41, whereby the same is operable when energized with single phase alternating current power delivered from a suitable power source through bus conductors 43 under the control switch 45.

Operating power is delivered to the windings of the motor 45 through switches 47 and 49, each of which comprises a blade electrically connected with the windings of the motor 35 and a running terminal 51, the conductors 43 being each connected with one of the terminals 51, so that when the switches 47 and 49 are in position engaging the running terminals 51, the motor 35 will be energized to rotate the anode 15.

The switches 47 and 49, however, have braking terminals 53, and I provide a switch 55, having a braking terminal 57 adapted to be engaged by the blade of the switch 55 when the blades of the switches 47 and 49 engage the braking terminals 53. To this end, the blades of all of the switches 47, 49 and 55 are mechanically interconnected for simultaneous operation. The switches preferably are normally biased to engage the braking contacts but may be drawn into engagement with the running contacts by means of a relay coil 59 which is connected across the conductors 43 so as to be energized upon the closure of the switch 45. When the switch 45 is closed, the blades of the switches 47, 49 and 55 are drawn away from the braking contacts 53 and 57 and engage the blades of the switches 47 and 49 with the running contacts 51, and thus deliver operating power to the windings of the motor 35. The blades of the switches 47, 49 and 55 are preferably biased by suitable spring means toward engagement with the braking contacts 53 and 57, so that as soon as the coil 59 is deenergized by the opening of the switch 45, the blades of the switches 47, 49 and 55 will immediately be moved into engagement with the braking contacts 53 and 57, thereby interrupting the connection between the windings of the motor 35 and the conductors 43 at the switches 47 and 49.

The braking contacts 53 are electrically connected to the opposite ends of a rectifier 61, preferably a dry disk copper oxide rectifier. The rectifier serves to deliver unidirectional power therethrough to the windings of the motor when the blades of the switches 47 and 49 are in contact with the braking terminals 53, thereby applying a braking force upon the anode in order to bring it rapidly to a standstill after the switch 45 is opened. The rectifier 61 is actuated from a suitable source of alternating current power, which may be the same source used for energizing the windings of the motor 35 in order to actuate the same; and to this end, the rectifier 61 is connected in a series circuit, including the power source, the switch 55, a current limiting resistance 63, and a time delay relay switch 65. In the illustrated embodiment, this circuit is accomplished by connecting the blade of the switch 55 with the power source, the braking terminal 57 being connected with one side of the rectifier, the other side of which is connected through the resistor 63 and the switch 65 with the power source. The switch 65 is normally biased toward open position but is under the control of an operating coil 67 which is connected, through suitable transformer means 69, with the conductors 43 so that the coil 67 is energized to close the switch 65 against its biasing means whenever and as long as the switch 45 remains closed. When the switch 45, however, is opened to deenergize the windings of the motor 35, the coil 67 is also deenergized, thereby permitting the switch 65 to open after a predetermined time delay interval. The purpose of the switch 65, of course, is to cut off direct current braking power delivered through the rectifier 61 and the switches 47 and 49 after the motor 35 has reached standstill condition, and, of course, I do not necessarily wish to limit my present invention to the particular means illustrated for thus deenergizing the rectifier after an interval within which the rotating anode shall have been brought to standstill. On the contrary, any suitable or preferred mode of deenergizing the rectifier, or for controlling the delivery of unidirectional power to the motor for braking purposes, is within the contemplation of the present invention.

It will be seen from the foregoing that the device of my present invention operates to deliver alternating current power to the windings of the motor 35 upon the closure of the switch 45, this delivery of power being accomplished by the operation of the relay coil 57 closing the switches 47 and 49 upon the running contacts 51. When the control switch 45 is opened to deenergize the motor, direct current is placed upon the running winding of the motor as soon as the switches 47 and 49 engage the braking contacts 53, the switch 65 which controls the delivery of unidirectional potential between the contacts 53 being closed for an interval after the opening of the switch 45. The application of unidirectional power on the running winding will act rapidly to bring the motor and anode to standstill within a few seconds, the switch 65 being adjusted to open after a sufficient delay interval to allow the rotor to be completely stopped through the application of unidirectional power to the motor winding in the manner described.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. The combination, with an X-ray tube having a rotatable anode, of an electric motor having a plurality of phase windings for driving said anode, means for connecting said windings with a source of alternating current power for actuating said motor, and means to apply unidirectional current to at least one of said windings to brake the motor rapidly after disconnection of said windings from said source.

2. The combination, with an X-ray tube having a rotatable anode, of a capacitor motor having split phase windings having interconnected ends and free ends separated by condenser means, means to connect said windings with a source of alternating current power for actuating the motor, and means to deliver unidirectional current through one of said windings only after disconnection of said windings from said source, whereby to brake said motor rapidly to standstill condition.

3. The combination, with an X-ray tube having a rotatable anode, of an electric motor having a plurality of phase windings for driving said anode, selectively operable switch means for connecting said windings with a source of alternating current power for driving said motor and for connecting at least one of said windings with a source of unidirectional power for braking the motor, said switch means being normally biased toward braking position, and master control means operable to shift said switch means to motor driving position and to release same for return to braking position.

4. The combination, with an X-ray tube having a rotatable anode, of an electric motor having a plurality of phase windings for driving said anode, selectively operable switch means for connecting said windings with a source of alternating current power for driving said motor and for connecting at least one of said windings with a source of unidirectional power for braking the motor, said switch means being normally biased toward braking position, master control means operable to shift said switch means to motor driving position and to release same for return to braking position, and means operable to prevent application of braking power on the motor after it has reached standstill condition under the influence of such braking power.

5. The combination, with a split phase capacitor induction motor, comprising a pair of windings having directly interconnected ends and ends connected through condenser means, of switch means operable to connect spaced stations on one winding selectively with a source of alternating current for actuating the motor and with a source of direct current for braking the same, said switch means being normally biased toward braking position, manually operable master control means operable to shift said switch means to motor driving position and to release same for return to braking position, and time delay switch means operable to prevent application of braking power on the motor after it has reached standstill condition under the influence of such braking power.

6. The combination, with an X-ray tube having a rotatable anode and an electric motor having a plurality of phase windings for driving the anode, of a control system for energizing the motor alternately from alternating current electric driving power and a source of unidirectional electrical braking power, comprising a control switch operable to connect the system with the source of driving power, a switch having a pair of switch elements electrically connected with said motor windings and normally biased to connect with said source of braking power, means to move said switch elements from position connected with said source of braking power into electrical connection with said source of driving power when said control switch is in position connecting the system with said source of driving power, and means to control the application of braking power in said system, comprising a time delay switch operable to make braking power available in the system when the system is connected with said source of driving power, said time delay switch being operable, following a time delay interval after disconnection of said source of driving power from said system, to disconnect said source of braking power from said motor windings.

JAMES G. BROWN.